June 28, 1932.  J. B. HARRIS, JR  1,865,186
COLOR PHOTOGRAPHY
Filed Jan. 23, 1929

INVENTOR
Joseph B. Harris, Jr.
BY
Lyman E. Dodge
ATTORNEY

Patented June 28, 1932

1,865,186

UNITED STATES PATENT OFFICE

JOSEPH B. HARRIS, JR., OF LOS ANGELES, CALIFORNIA

COLOR PHOTOGRAPHY

Application filed January 23, 1929. Serial No. 334,391.

This invention relates to photography and particularly to natural color photography and more especially to a method and apparatus for obtaining color selection negatives.

It is well known to those familiar with the art of natural color photography as now usually practiced that a positive print is obtained by use of what are known as color selection negatives. These color selection negatives are negatives each one of which is a representation of certain colors or color values in a subject, that is, a red color selection negative would be a negative showing those parts of the subject which are colored red, that is, which reflect red rays, and a blue-green color selection negative would be one which represented those parts of the subject which reflected blue-green light. Many prints as is well known are now made from two color selection negatives, one the red negative, the other, the blue-green negative.

A principal object of this invention is to obtain two negatives which will represent substantially complementary color values in the subject and one will also represent the black and white value of the subject photograph so as to make what might be termed a key-image by a method which comprises practically one exposure but which is in fact two exposures with no time interval therebetween, that is, one follows the other without an interval in which the negative films are not exposed.

Other objects and advantages will appear as the description of the method and one particular physical embodiment of the apparatus for carrying out the method progresses and the novel features of the invention will particularly be pointed out in the appended claims.

Figure 1:
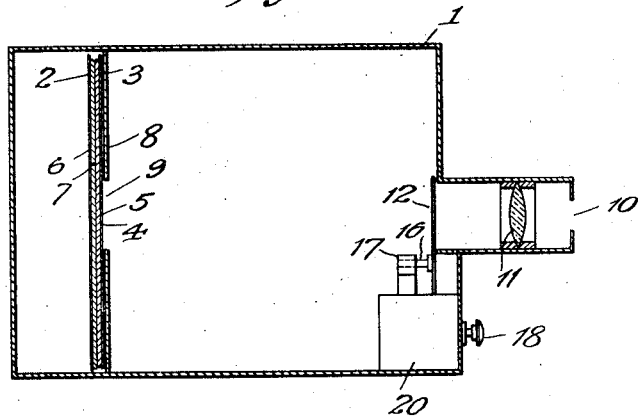
Figure 2:
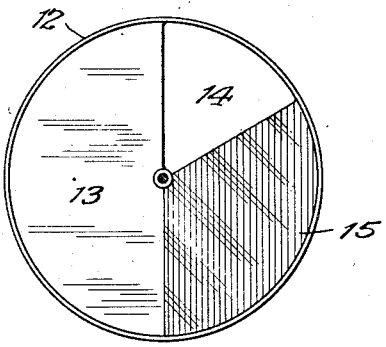

In describing the invention in detail and the particular physical embodiment selected to illustrate the apparatus for carrying out the method reference is had to the accompanying drawing wherein has been illustrated a physical embodiment of apparatus for practicing the method, and wherein like characters of reference designate corresponding parts throughout the several views, and in which:

Figure 1 is a schematic representation of a device simulating a camera embodying apparatus by which applicant's method may be practiced; Fig. 2 is a detailed view of a photograph shutter used in connection with the apparatus of Fig. 1.

In practicing the method applicant has in view the production of color motion picture positive prints but the method is equally applicable to the making of natural color prints of still objects so that for the purpose of explaining the method the apparatus has been shown in the merest, sketchy schematic form with the exception of the new form of filter shutter which has been devised by applicant for use in practicing the method of his invention.

The drawing Figure 1 is schematic but is intended to simulate roughly an ordinary camera box. This box has been designated 1 and is merely illustrative of a light tight compartment. In accordance with applicant's method two negative films are placed substantially at the focal plane in the camera. This arrangement is diagrammatically illustrated in Fig. 1 by the presence of the negative films 2 and 3. In accordance with applicant's invention the negative film 3 is of the usual type formed with a transparent carrier 4 and a coating 5 of colloid containing the emulsion of the light sensitive material. The negative film 3 is intended to represent the ordinary film of commerce preferably motion picture film, and is substantially insensitive to red rays, that is, it is red blind.

The negative film 2 has a carrier 6 and a coating 7 of a colloid containing the emulsion of light sensitive material. The negative film 2 is however sensitive to red rays and may well be the well known article of commerce known as panchromatic stock. The films 2 and 3 are placed in contact with the coating of one adjacent the coating of the other.

In the schematic drawing Fig. 1 applicant has illustrated a partition 8 which is merely intended to illustrate an image defining opening 9, that is, the opening 9 is substantially of a size such that the light coming from a subject will affect only that particular portion of the film which may be defined as the image area and has more particular reference to that type of photograph in which the continuous film is moved intermittently into position to have a latent image formed thereon.

Applicant has further illustrated diagrammatically the ordinary camera stop or opening 10 through which the light passes to the lens 11.

In applicant's method the light either before or after passing through the lens but preferably after as illustrated in the drawing, passes through what applicant has termed a filter shutter, designated as a whole by 12. This filter shutter, as shown by Fig. 2, comprises a portion 13 which is entirely opaque, a portion 14 which is a cut-away portion, and a portion 15 which is transparent but which is colored. The color of the portion 15 depends upon the particular color selection negative which it is desired to make. In the present instance the arrangement is such that the portion 15 is colored red. It is desired to make of film 2 a red color selection negative.

The filter shutter or disc as shown in Fig. 1 with the portion 13 in line with the lens 11 prevents all light from reaching the films 2 and 3. The filter shutter in the form shown is mounted on an arbor 16 in a bearing 17 so that the filter shutter may revolve. Any convenient or ordinary and well known means of which many are well known in the photographic art may be used to cause a revolution of the disc 12. It merely suffices to select of the many well known mechanisms such a one as will upon pushing the button 18 allow the disc to revolve one complete revolution. With the arrangements as diagrammatically shown in Fig. 1 with the opaque portion 13 of the shutter opposite the lens 11 the opening 10 would be properly directed to the subject of which color selection negative were desired then at the proper moment the button 18 would be pressed whereupon the well known mechanism within the box 20 would cause one complete revolution of the shutter 12 bringing first the opening 14 into line with the lens 11 and subsequently the transparent red color portion 15 into line with the lens 11. By such manipulation the negative film 3 would have formed therein a latent image including the blue-green color values of the subject together with the black and white color values. This latter would form a key-image. There would also be formed in film 2 a latent image of the red color value in the subject photograph. The ordinary and well known process then being applied to those two negative films would result in color selection negatives one having the red color values therein, that is, the film designated 2 and the other having the black and white image together with the blue-green color values. By means of these two negatives a single print may be formed by well known methods to give a transparency including the blue-green and the red color values of the subject photograph.

The opening 14 of the filter shutter of course, allows light to fall upon the film 3 and as that film and its coating are transparent to also fall upon the film 2 but the opening 14 may be so proportioned that the light value will be such that appreciable affects will be absent from the light sensitive material of film 2.

The method hereinbefore described of forming color selection negatives is as applicable to motion picture photography as to still photography. In either case it merely suffices to arrange two films, and by films it is intended to indicate a negative having the light sensitive coating on a transparent carrier, so that the coating of one is substantially in contact with the coating of the other and to provide a construction whereby the light from the subject to be photographed at some point in its path before reaching the films will during the operation of the exposure of a given film area be caused to pass through a colored filter. This color filter may be positioned back of the lens as shown in Fig. 1 but of course, it is well understood by those acquainted with the art of photography that exactly the same effect may be obtained by positioning the disc 12 in front of the lens.

Although I have particularly described my improved method and have diagrammatically illustrated a schematic construction of one physical embodiment of an apparatus for practicing the method of my invention and have explained the operation thereof, nevertheless, I desire to have it understood that the form of apparatus schematically illustrated is merely illustrative but does not exhaust the possible physical embodiment of means for practicing the invention and that the method may well be practiced by the use of means other than those particularly shown in the drawing and described in this specification.

What I claim as new and desire to secure by Letters Patent of the United States, is:

1. The method of forming color selection negatives which consists in first placing a red insensitive negative photographic film and a red sensitive negative photographic film substantially in contact coating to coating and then allowing the light from a subject to fall thereon and subsequently allowing the red light only from the subject to fall thereon, the red insensitive negative film being so positioned as to first receive the light.

2. The method of forming color selection negatives which consists in first placing a red insensitive negative photographic film and a red sensitive negative photographic film substantially in contact coating to coating and then allowing a definite light value from a subject to fall thereon and subsequently allowing the red light only from the subject to fall thereon the red insensitive negative film being so positioned as to first receive light.

3. The method of forming color selection negatives which consists in first placing a red insensitive negative photographic film and a red sensitive negative photographic film substantially in contact coating to coating and then allowing the light from a subject to fall thereon and subsequently after interposing a red color filter to then allow the light from a subject to fall thereon.

JOSEPH B. HARRIS, Jr.